(12) United States Patent
Sillasto et al.

(10) Patent No.: US 7,706,814 B2
(45) Date of Patent: Apr. 27, 2010

(54) SYSTEM AND METHOD FOR GENERATING A LOCATION ESTIMATE FOR A MOBILE STATION

(75) Inventors: Eero Sillasto, Helsinki (FI); Maurizio Spirito, Turin (IT)

(73) Assignee: Nokia Corporation, Espoo (FI)

( * ) Notice: Subject to any disclaimer, the term of this patent is extended or adjusted under 35 U.S.C. 154(b) by 81 days.

(21) Appl. No.: 10/917,470

(22) Filed: Aug. 13, 2004

(65) Prior Publication Data

US 2005/0255865 A1 Nov. 17, 2005

(30) Foreign Application Priority Data

May 12, 2004 (GB) ................................. 0410608.4

(51) Int. Cl.
*H04W 24/00* (2009.01)
*H04M 11/04* (2006.01)

(52) U.S. Cl. ............... 455/456.5; 455/404.2; 455/456.1

(58) Field of Classification Search .............. 455/404.2, 455/457, 456.1, 456.3, 404.1
See application file for complete search history.

(56) References Cited

U.S. PATENT DOCUMENTS

| | | | |
|---|---|---|---|
| 3,531,801 A | 9/1970 | Huebscher | |
| 5,293,642 A * | 3/1994 | Lo | 455/456.2 |
| 5,945,948 A * | 8/1999 | Buford et al. | 342/457 |
| 6,665,332 B1 * | 12/2003 | Carlson et al. | 375/130 |
| 6,728,545 B1 * | 4/2004 | Belcea | 455/456.2 |
| 7,233,799 B2 * | 6/2007 | Spain, Jr. | 455/456.1 |
| 2002/0094820 A1 * | 7/2002 | Keranen et al. | 455/456 |
| 2004/0002346 A1 | 1/2004 | Santhoff | |

* cited by examiner

*Primary Examiner*—Charles N Appiah
*Assistant Examiner*—Emem Stephen
(74) *Attorney, Agent, or Firm*—Squire, Sanders & Dempsey L.L.P.

(57) ABSTRACT

The method generates a location estimate for a mobile station in a wireless communications network. The method includes receiving first measurement data relating to at least one radio link between the mobile station and a first site, and provides a first distance estimate of the mobile station from the first site based on the first measurement data. Second measurement data is received, relating to at least one radio link between the mobile station and a second site and provides a second distance estimate of the mobile station from the second site. First and second intersection points are determined between a circle centered at the first site of a radius corresponding to the first distance estimate, and a circle centered at the second site of the radius corresponding to the second distance estimate. The first and second intersection points lie on opposite sides of a line passing through the first and second sites. At least one of the first and second intersection points are used in the determination of the location estimate.

19 Claims, 10 Drawing Sheets

SYSTEM AND METHOD FOR GENERATING A LOCATION ESTIMATE FOR A MOBILE STATION

FIELD OF THE INVENTION

The present invention relates to a method and an apparatus for locating a mobile terminal in a communications network, particularly but not exclusively using multiple sources of information.

BACKGROUND TO THE INVENTION

The ability to pinpoint the location of mobile terminals is a desirable feature of a mobile telephone network. This is because of the need to provide customer services which rely on knowing the whereabouts of users of these services. For example, up-to-date local traffic information can be provided to enable a user to avoid nearby traffic jams. A user may also wish to know, for example, how to get to the nearest pub or restaurant from their present location. Clearly the location of the user must be ascertained to within even a few meters for this type of service to work.

Another reason for wishing to know the location of a mobile terminal is so that emergency services can locate a caller who is unable to provide an accurate personal location themselves.

It is known in a GSM mobile network to provide the location of a mobile telephone in terms of the cell of the network in which the telephone is located. Each cell contains one base station and a telephone is only ever in traffic communication with one base station at a given time. Hence the location of the telephone to an accuracy of the cell area can be determined simply by ascertaining with which base station the telephone is communicating. Such methods are known as cell-based location methods. Other methods can be combined with the cell identity (CI), such as a triangulation system, in which the location of a particular mobile phone is calculated using control signals from at least the three base stations closest to it (two of which are located in adjacent cells to the cell in which the mobile telephone is located). This system uses the assumption that the distance of the phone from a base station is proportional to the strength of the signal which the base station receives from it, or the time taken for the signal to travel between the phone and the respective base station. Thus the position of the phone can be determined by comparing the relative strengths or travel times of received signals between the three base stations and thus assessing the distance of the user from each base station. The actual location of the user is then obtainable geometrically since the location of the base stations is known and fixed.

In a 3GPP (3$^{rd}$ Generation Partnership Project) network using a Wideband Code Division Multiple Access (W-CDMA) signalling system, it is possible for a mobile terminal to be in active communication with more than one base station at any one time. This situation is known as "soft handover" and differs from (hard) handover in a GSM system, in which a mobile terminal is "handed over" from one base station to another as it moves between cells of the network. Because of the nature of the soft handover, the above-described cell-based mobile location procedures suitable for GSM can not always be used in a W-CDMA type signalling system. It has therefore been necessary to develop more reliable ways of locating a mobile terminal in this type of signalling system.

In W-CDMA a "softer handover" is defined as well. In the case of "softer handover" the antennas of the base stations with which the mobile station is communicating are co-located (e.g. they are installed at the same physical location or site). In the remainder of this document, the term "soft handover" will be used also to cover the case of "softer handover", and it will be understood by those skilled in the art that the invention and the described embodiments thereof are applicable to a softer handover situation as well as a soft handover situation.

Location techniques are known which are directed towards calculation of a location estimate and a "confidence region" associated with the location estimate of a User Equipment (UE).

One such technique is a Cell Identity and Round Trip Time (CI+RTT) location method.

The CI+RTT location method in UMTS relies on the availability of Round Trip Time (RTT) and Rx-Tx Time Difference (RxTxTD) measurements. RTT and RxTxTD measurements are introduced in UMTS FDD (Frequency Division Duplex) to allow the implementation of the CI+RTT location method.

The RTT is defined as $RTT = T_{Rx}^{UL} - T_{Tx}^{DL}$, where $TD_{Tx}^{DL}$ is the time of transmission of the beginning of a downlink dedicated physical channel (DPCH) frame to a User Equipment (UE) and $T_{RX}^{UL}$ is the time of reception of the beginning (the first detected path, in time) of the corresponding uplink DPCCH (Dedicated Physical Control Channel)/DPDCH (Dedicated Physical Data Channel) frame from the UE.

The $RxTxTD = T_{Tx}^{UL} - T_{Rx}^{DL}$ is the difference in time between the UE uplink DPCCH/DPDCH frame transmission ($T_{Tx}^{UL}$) and the first detected path (in time) of the downlink DPCH frame from the measured radio link ($T_{Rx}^{DL}$).

RTTs are measured by the base stations, RxTxTDs are measured by the UE.

By combining a pair of RTT and RxTxTD measurements referred to the same base station the distance between the UE and that base station can be estimated. Such distance estimate is analogous to the distance estimate that can be obtained from one Timing Advance (TA) in GSM. In this sense, the CI+RTT location method corresponds to the Cell Identity+ Timing Advance (CI+TA) location method in GSM. However, two particular features of UMTS FDD make the CI+RTT method potentially more accurate than the CI+TA method in GSM:

1. The much shorter UMTS chip period as compared to the GSM bit period affects the resolution with which a distance estimate can be determined from a TA in GSM or from an (RTT, RxTxTD) pair in UMTS. One GSM bit period is equivalent to approximately 1100 meters while one UMTS chip period is equivalent to approximately 80 meters, thus the distance measurements resolution in UMTS is better than in GSM.

2. In UMTS a UE can be in soft handover. UMTS standards require that RTTs and RxTxTDs are measured for each active radio link, thus multiple distance estimates can be potentially available for locating one UE in UMTS. In GSM this is not possible since the TA is available only for the unique serving cell.

In the CI+RTT location method the unknown geographical coordinates of the UE whose position it is desired to determine are estimated by combining absolute distance measurements between the UE and the base stations in the active set. Each absolute distance measurement is calculated from each (RTT, RxTxTD) pair.

Existing CI+RTT location methods can be considered to fall broadly into two general categories, single-site location methods and multi-site location methods. There are a number of good, reasonably accurate algorithms for implementing multi-site location methods when the UE have active radio links with cells located at three or more sites. However, such methods often fail when two or less sites are available for location calculation purposes.

The need for limiting the number of active radio links allocated to a W-CDMA UE (to limit network load) makes the likelihood of calculating a location estimate using only two sites much higher than the likelihood of having three or more sites available for calculating it. Therefore, there is a real need for a location method which is capable of providing a good estimate of the UE location when only two sites are available.

It is noted herein that although the location methods which are discussed are particularly valuable in a situation where there are less than three sites available, they can of course be used in a situation with three or more sites as well.

SUMMARY OF THE INVENTION

According to one aspect of the invention there is provided a method of generating a location estimate for a mobile station in a wireless communications network, the method comprising: receiving first measurement data relating to at least one radio link between the mobile station and a first site and providing a first distance estimate of the mobile station from the first site based on the first measurement data; receiving second measurement data relating to at least one radio link between the mobile station and a second site and providing a second distance estimate of the mobile station from the second site; determining first and second intersection points between a circle centred at the first site of a radius corresponding to the first distance estimate and a circle centred at the second site of a radius corresponding to the second distance estimate, said first and second intersection points lying on opposed sides of a line passing through the first and second sites; and using at least one of the first and second intersection points in the determination of the location estimate.

A further aspect of the invention provides in a cellular communications network, a network entity adapted to generate a location estimate for a mobile station in the network, the network entity comprising: means for receiving measurement data relating to radio links established between the mobile station and each of first and second sites, and providing first and second distance estimates of the mobile station from the first and second sites respectively based on the measurement data; means for determining first and second intersection points between a circle centred at the first site of a radius corresponding to the first distance estimate and a circle centred at the second site of a radius corresponding to the second distance estimate, said first and second intersection points lying on opposed sides of the line passing through the first and second sites; and means for utilising at least one of the first and second intersection points in the determination of the location estimate.

For a better understanding of the present invention and to show how the same may be carried into effect, reference will now be made to the accompanying drawings.

DESCRIPTION OF THE PREFERRED EMBODIMENTS

Before describing methods in accordance with embodiments of the present invention, a detailed description of one possibility for calculating a distance estimate will firstly be described with reference to FIG. 1, because this is an important component of the location methods discussed in the following. It will be appreciated however that other distance estimation techniques could be used.

Figure 1:
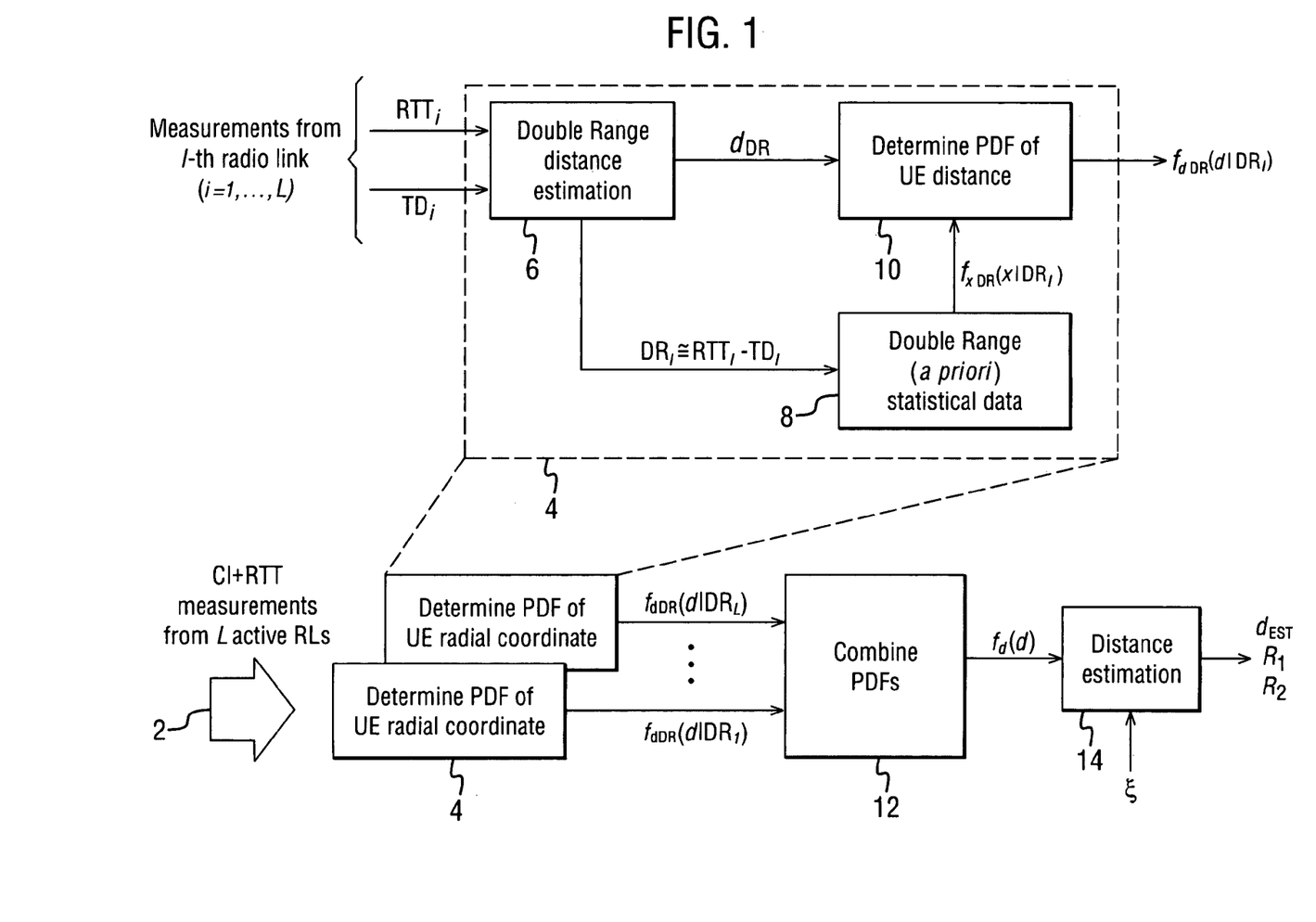
FIG. 1 is a schematic block diagram of distance estimation equipment.
Figure 2:
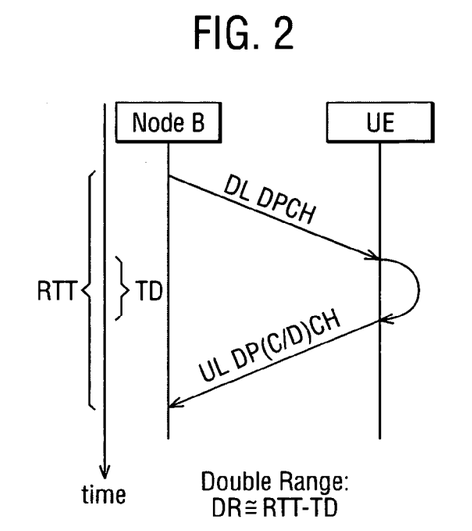
FIG. 2 is a diagram illustrating RTT and TD.

FIG. 1 is a schematic block diagram illustrating the blocks involved in a distance estimate calculation obtained from a set of measurement pairs of the round trip time (RTT) and Rx–Tx time difference (TD). FIG. 2 illustrates what these distances represent in a mobile communications network. FIG. 2 illustrates a user equipment UE which can be in the form of a mobile telephone or other mobile terminal and a Node B, which represents a base station in the universal telecommunications radio access network (UTRAN) system. A downlink dedicated physical channel signal labelled DL DPCH in FIG. 2 dispatched from node B takes a certain amount of time to reach the user equipment UE. There is a time delay TD at the user equipment before an uplink response to the downlink signal is returned from the user equipment to Node B. This response is labelled ULDP(C/D)CH in FIG. 2. The total circuit time measured from dispatch of the downlink signal to receipt of the corresponding uplink signal is the round trip time RTT. That is, it represents the difference between the time of transmission of the beginning of a downlink dedicated physical channel (DPCH) frame to a user equipment UE and the time of reception of the beginning of the corresponding uplink UL dedicated physical control channel (DPCCH)/dedicated physical data channel (DPDCH) frame from the user equipment.

The time difference TD is, as explained, the difference in time between the uplink ULDPCCH/DPDCH frame transmission and the first detected part of the downlink DPCH frame. This delay is in a typical case nominally equal to 1024 chip periods. A measurement pair of $RTT_i$, $TD_i$ values is supplied to the distance estimation equipment from each i-th active radio link in the mobile communications network. The manner in which measurements for co-located cells (that is cells served from the same site) are dealt with differs depending on the location method which is to be implemented, as will become clear in the following. For the purpose of describing FIG. 1, it is assumed that one distance estimate is obtained from a set of RTT, TD measurement pairs measured from active radio links supplied by co-located cells.

The measurement pairs are denoted by arrow 2 in FIG. 1, each pair being supplied to a respective probability function determination block 4. Each probability determination block 4 comprises a double range distance estimation calculator 6 which calculates a double range distance estimate $d_{DR}$ from each RTT and TD measurement pair. $d_{DR}$ is an estimate expressed in meters of the distance between the user equipment and the location of node B at the site of the serving cell. It is calculated by converting into meters an integer number, the so-called double range (DR) which is obtained by removing the TD value contribution from the RTT value. A statistical data block 8 holds a priori statistical data that has been gathered which gives an estimate of the likely measurement error in the double range distance estimate. That is, given the exact distance between the user equipment UE and the serving cell, d, it is possible to calculate the double range measurement error, $x=d-d_{DR}$. Such an error can arise as a result of several factors: multipath and non-line of sight propagation, measurement algorithms inaccuracy, granularity introduced by the measurements finite resolution, etc. By premeasuring data of this kind, a probability density function of the double range measurement area can be determined and this is supplied to a PDF determination (probability density function determination) block 10 which combines the PDF of DR measurement error $f_{x|DR}$ (x|DR) with the DR distance estimate $d_{DR}$, to obtain the PDF of the UE distance from each co-located serving cell $f_{d|DR}(d|DR) = f_{x|DR}(x=d-d_{DR}|DR)$.

The probability density functions of the distance from all the co-located serving cells is then combined into one probability density function, $f_d(d)$ representing the probability density function of the distance of the user equipment UE from the site where all the serving cells' antennas are installed. This is carried out in the combine PDF block 12. Once the combined PDF is available, the distance estimation is performed in the distance estimation block 14. The result of the distance estimation is represented by three values:

a distance estimate, $d_{EST}\mu 0$
an inner radius, $0[R_1[d_{EST}$
an uncertainty radius, $R_2 \mu 0$ The distance estimate $d_{EST}$ is calculated as the median of the combined distance distribution from the PDFs. The inner and uncertainty radii define a confidence interval $[R_1, R_1+R_2]$ within which the exact distance d of the user equipment UE is estimated to fall with a predefined confidence coefficient, ϑ. The value of the confidence coefficient depends on the target confidence level requested by the user of the location algorithm, and is input into the distance estimation block 14 as shown in FIG. 1.

Figure 3:
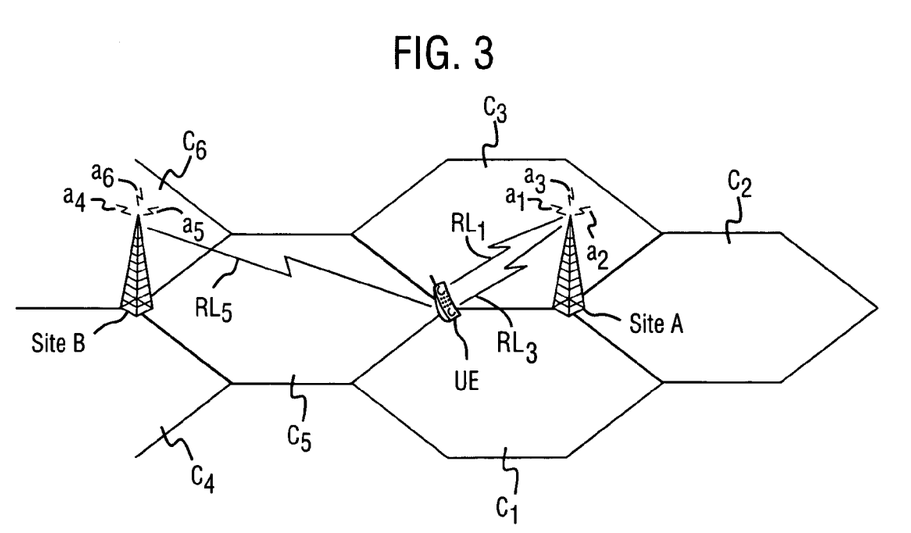
FIG. 3 is a sketch of part of a cellular communications network.

A description of a technique for estimating the location of a user equipment UE in accordance with a first embodiment of the invention will now be described. FIG. 3 illustrates the physical situation in which this method may be used.

FIG. 3 represents part of a cellular communications network illustrating a first base station at Site A and a second base station at Site B. Each base station serves three cells with accordingly oriented antennas. The cells are labelled $C_1$, $C_2$ etc and the antennas are labelled $a_1$, $a_2$ etc. The orientation of the antennas at each site is known, and the assumption is made that the cell identity CI provides network data including for example antenna orientation data. A user equipment UE is shown in softer handover at Site A, that is with a first radio link $RL_1$ established with antenna 1, and a second radio link $RL_3$ established with antenna 3. The user equipment UE also has a radio link $RL_5$ established with antenna 5 of the base station at Site B.

Figure 3A:
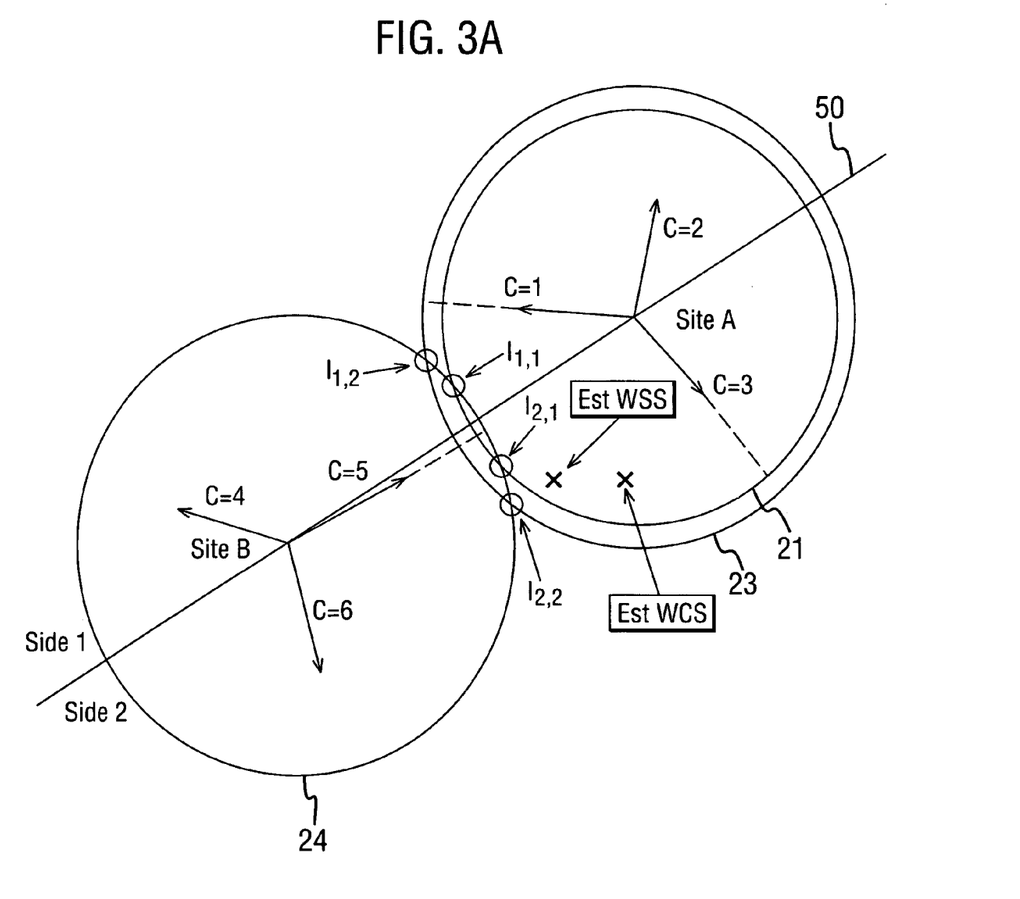
FIG. 3A is a schematic diagram of a SELRP location method.
Figure 3B:
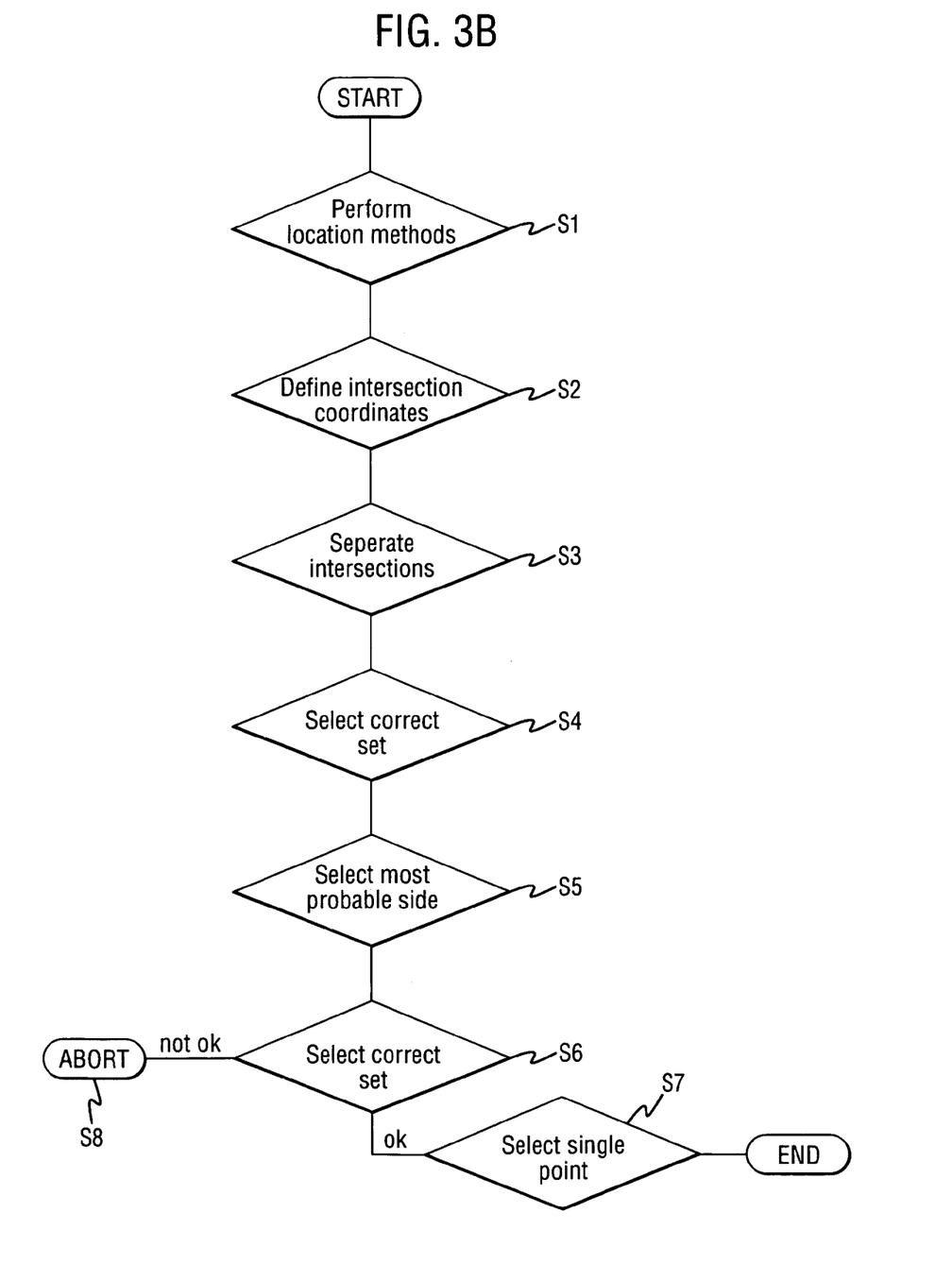
FIG. 3B is a flow diagram of the SELRP method of FIG. 3A.

FIG. 3A is a schematic diagram illustrating determination of a location estimate method referred to as SELRP (selecting reference point) method, implemented in the network as illustrated in FIG. 3. FIG. 3A shows the two base stations labelled as Site A and Site B with their respective antennae, which are indicated diagrammatically by arrows in approximately the antenna direction. A flow chart of the SELRP location estimation method is illustrated in FIG. 3B.

FIG. 3A also illustrates a circle, 24, centred at Site B, and two circles of different radii, 21, 23, centred at Site A. The radii of these circles are distance estimates which have been obtained using the distance estimation equipment discussed above with reference to FIG. 1, based on RTT measurement data received from the mobile station to be located at sites A and B. FIG. 3A also illustrates a site intersecting line, 50, which passes through sites A and B and divides the area into first and seconds sides, side 1, side 2. The circles 21 and 23 intersect the circle 24 at intersection points which are labelled according to their side, with points $I_{1,1}$, $I_{1,2}$ belonging to side 1 and points $I_{2,1}$, $I_{2,2}$ belonging to side 2. These intersection points fulfil the requirement that they meet the two different estimations from the two different sites perfectly, but the problem remains, which of the sides to choose, and which of the intersection points on a particular side when there is more than one.

A procedure to make a selection based on deducing the most probable intersections will now be described with reference to FIG. 3B. As a first step, a plurality of different location estimates are generated by implementing a number of different location estimate generation methods. This is labelled as step S1 in FIG. 3B. The estimates which have been generated as a result of two such methods are labelled in FIG. 3A as Est WSS and Est WCS. Est WSS is the location estimate generated by a weighted single site (WSS). Est WCF is a location estimate generated by a weighted single cell (WSC) method. These methods will be described in more detail in the following.

At step S2, co-ordinates for all the intersections of the circles are defined. There may be one or more intersection points for each site, depending on the number of distance estimates which are obtained, and hence the number of intersection circles that are established.

At step S3, the intersection points are separated into two sets by the site intersection line 50. The sets are defined herein as $I_1$, $I_2$ where $I_1$ includes the intersection points $I_{1,1}:I_{1,k}$ and $I_2$ includes the intersection point $I_{2,1}:I_{2,k}$ where k represents the number of members in each of the sets $I_1$ and $I_2$. All members of $I_1$ are first defined to lie on one side of the line 50 and all members of $I_2$ on the other side of the line 50. In FIG. 3A, k=2, and the set $I_1$ comprises $I_{1,1}$, $I_{1,2}$, while the set $I_2$ comprises $I_{2,1}$, $I_{2,2}$.

According to step S4, numbers are calculated related to the probability that a side using a distance calculation method which can be for example one of the following:

1. Calculate the distance of the mth location estimate from the nth site, $r_{mn}$, and use this with the original distance estimate to minimise a cost function based on the error:

$$e_{mn} = d_{est,n} - r_{mn}$$

where $d_{est,n}$ is the distance estimate which was obtained to establish the radii of the circles 21, 23, 24.

The cost function $f_m$ can be $$f_m = \sum_n (e_{mn}^2) \text{ or } f_m = \sum_n |e_{mn}|.$$

2. Calculate the distances from the mth location estimate to each intersection point separately, and sum the distances from the mth location estimate to all intersection points separately ($SUM_1$, $SUM_2$).

In step S5, the most probable side is selected by using the location of the location estimates which were already determined (in this case, Est WSC and Est WSS). In FIG. 3A, it is clear that side 2 is selected. However, it may not be so clear (for example where the generated location estimates are located on different sides of the line 50), and in that case, a probability for the side can be used based on the distances which have been determined in step S4. For example, the probability could be based on the distances of the intersections to the location estimates. For example, in the case that method 1) is used, assume that the results from the functions used in 1), are WSS:f_WSS=10, and for WSC:f_WSC=73. Now, as the value f_WSS is better (smaller), it can be decided that estWSS is on the right side. But if f_WSC were 15, the side is not so obvious. Probabilities can be provided, e.g. the side of WSS=function_A(f_WSS, F_WSC) and the other side probability is (1-WSS_probability). Many functions could be used, depending naturally on the function used in 1).

In the case of method 2), there are two distances for each estimate like WSS_1=48 and WSS_2=973, and WSC_1=66 WSC_1=60 referring to two sides. Using the sum method, we get 48+66=114 and 973+60=1033, and we might choose side 1. Or we might give side 1 just a greater probability, like for example 1033/(114+1033)=90%, Many functions can be used.

Based on the results of steps S4 and S5, according to step S6, either the set $I_1$ or the set $I_2$ is selected based on the selected side. Any probabilities which have been used in the calculation are inherited with these sets. If the case is not clear (for example we get probabilities for the sides 1 and 2 like 20%/80%) we do not have to continue to select the side, but can use that knowledge in the location, e.g. give the preliminary estimates in side 1 of the 20% weight and in side 2 the 80% weight, and take the weighted average. Alternatively an IDI method (discussed later) can be used.

Intermediate results of this mature can be used to advantage in location, even if the full procedure cannot be performed.

The best intersection point within a set can be selected using a probability based on information gathered in step S4 concerning the distances. For example, if we just have selected side 1 by method 1) or 2), and have the distances to the intersections A and B in that side, WSS_A=223, WSS_B=20. It is possible to determine probabilities based on these numbers by a variety of probability methods. This is indicated at step S7. Step S7 is reached if it has been possible to select the correct set with a reasonable probability that the solution is correct. If, at step S6, this has not been the case, then the procedure aborts, as indicated at step S8. This could be the case, for example, where due to antenna orientations in different sites, the results are considered to be too controversial to make a proper selection. If a final selection, is reached that can be given as the final location estimation (at least if its probability reaches some accuracy limit (like 50%, 75%, or 99%). If not such set of the highest probabilities of intersections could be taken that fulfils the accuracy limit, and the final estimation could be done with those. e.g. by the weighted average. Note that the method applies for two sites, but can be utilised also for many sites in pairs of two.

Figure 3C:
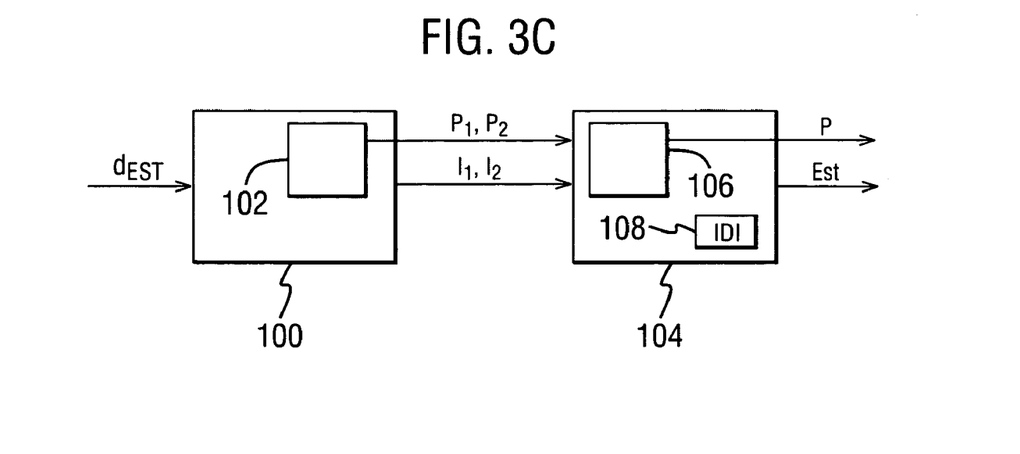
FIG. 3C is a schematic block diagram of functional blocks for implementing the method of FIG. 3A.

FIG. 3C is a schematic block diagram of functional blocks for implementing the above described method. Note that these functional blocks are for illustrative purposes only, and the method could be implemented using any suitable combination of software and hardware. The functional blocks can therefore be considered to represent different programs or computer programs or part of computer programs for implementing different functions. Functional block 100 receives the distance estimates and determines the first and second intersection points or sets of intersection points. In addition, it includes a probability determinator 102 which calculates the associated probabilities as mentioned above. The probabilities and the intersection points are supplied to functional block 104 which uses the information in determination of the location estimate Est. Selection means 106 use the probabilities to select the most likely side or set of intersection points. If a selection cannot be made, probability information P can be output or alternatively an IDI method 108 can be implemented.

The WSS and WSC methods will now be described in more detail.

Figure 4:
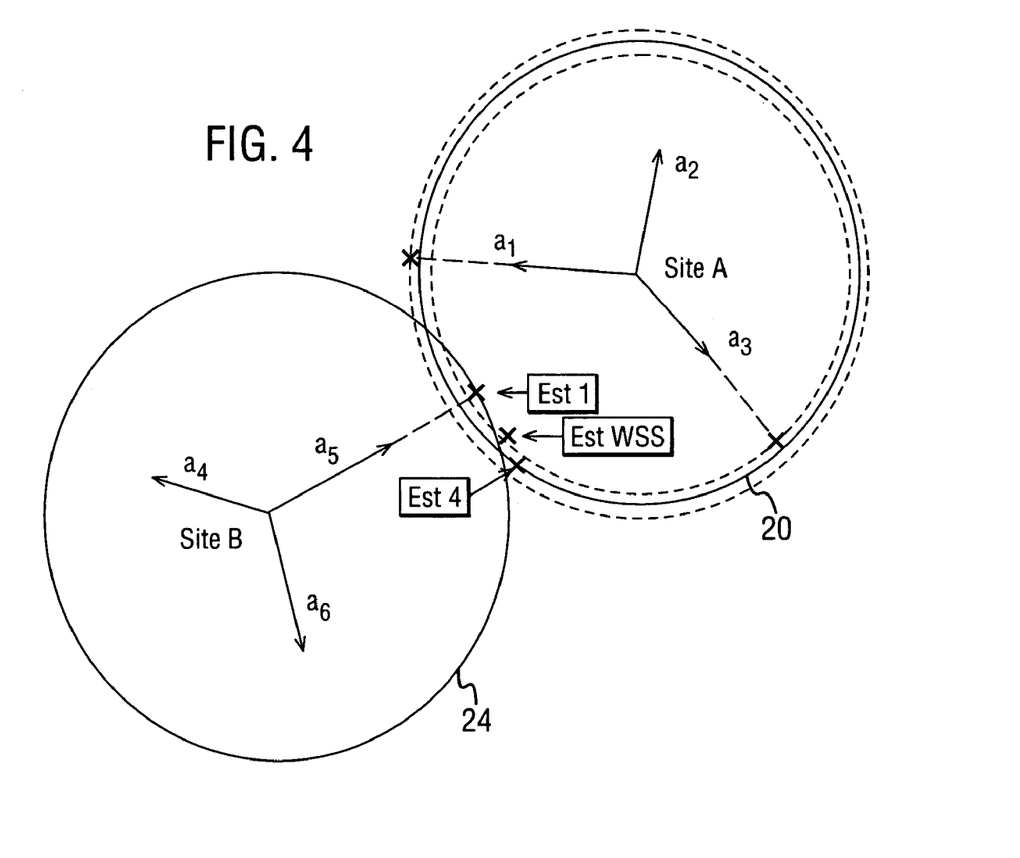
FIG. 4 is a schematic diagram of a WSS location method.

FIG. 4 is a schematic diagram illustrating how a location estimate can be obtained using the WSS method. A first estimated location which is labelled Est 4 in FIG. 4 is obtained in the following way. RTT, TD pairs from each of the radio links $RL_1$ and $RL_3$ are combined in the distance estimation equipment illustrated in FIG. 1 and an estimated distance $d_{EST}$ is produced, which represents the radius of the circle which is shown in full and labelled 20 in FIG. 4. Note that the dotted circles just inside and outside circle 20 represents different measurements for the estimated distance, which will be discussed more fully in relation to the WSS method discussed below.

A preliminary single site CI+RTT location estimate is obtained using the distance estimate obtained using the technique described above with reference to FIG. 1 and an angular estimation arrived at using a single site CI+RTT location based on the network data from the CI. An "averaged" orientation of the two antennas generating the radio links, in this case $a_1$ and $a_3$ is produced. Each preliminary location estimate is calculated in a polar reference system centred at each cell's site, using the single site CI+RTT method discussed later. The first location estimate Est 4 can thus be seen to lie at a distance $d_{EST4}$ along an averaged orientation of the antennas $a_1$, $a_3$. It will readily be appreciated that the orientation value which is used, being based on an average of the two antennas' orientation is a simple but primitive measurement. If more accurate orientation information relating to the user equipment UE is available, that could also be used to determine the first location estimate Est 4.

A second location estimate is obtained for Site B, in this case applying a single RTT, TD measurement pair to the distance estimation equipment of FIG. 1 and generating an estimated distance $d_{EST1}$ which in this case represents the radius of the circle denoted 24 in FIG. 4. Note that when a single RTT, TD pair is input into the distance estimation equipment of FIG. 1, there is no need to perform the combined PDF step of block 12, because only a single PDF is determined which is supplied directly to the distance estimation block 14. In this case, there is a single radio link RL5 and so the location estimate which is labelled Est 1 in FIG. 4 is generated by taking the estimated distance $d_{EST1}$ with the orientation of that antenna $a_5$, is the simplest case. Again, the angular estimation for the antenna orientation can be generated using the single site CI+RTT location method.

The final location estimate which is labelled Est WSS is obtained as the weighted mass centre of the preliminary location estimates, Est 1, Est 4. That is, the coordinates of the preliminary location estimate are taken (on a polar or Cartesian reference frame), weighted and then averaged.

In a Cartesian reference system, an algorithm which can be used in embodiments of the present invention to obtain the estimated x (and respectively, y) UE coordinates as a weighted average of the x (and respectively, y) site coordinates, the signal of which is received by the MS is given below:

$$\hat{x} = \frac{\sum_{i=1}^{N} w^i x^i}{\sum_{i=1}^{N} w^i}; \hat{y} = \frac{\sum_{i=1}^{N} w^i y^i}{\sum_{i=1}^{N} w^i}; (\hat{x}, \hat{y}) \in D$$

where $w^1, \ldots, w^N$ are suitable weights assigned to each one of the N estimates involved, $\hat{x}, \hat{y}$ are the coordinates of the final estimate and $xi^i, y^i$ are the coordinates of each preliminary location estimate.

One suitable definition for the i-th weight used in embodiments of the present invention is to use the inverse of the estimated distance, $d_{ESTi}$ associated with each preliminary location estimate:

$$w^i = \frac{1}{d_{ESTi}}$$

An alternative is to apply constant weights for all cells. A further alternative is to use weights equal to the inverse of the area of an arc-shaped confidence region which is determined as a by-product to the preliminary single site CI+RTT location calculation (discussed later). Another possible criterion for determining the weights is to assign higher weights to preliminary location estimates which are believed to originate from more accurate distance measurements.

Figure 5:
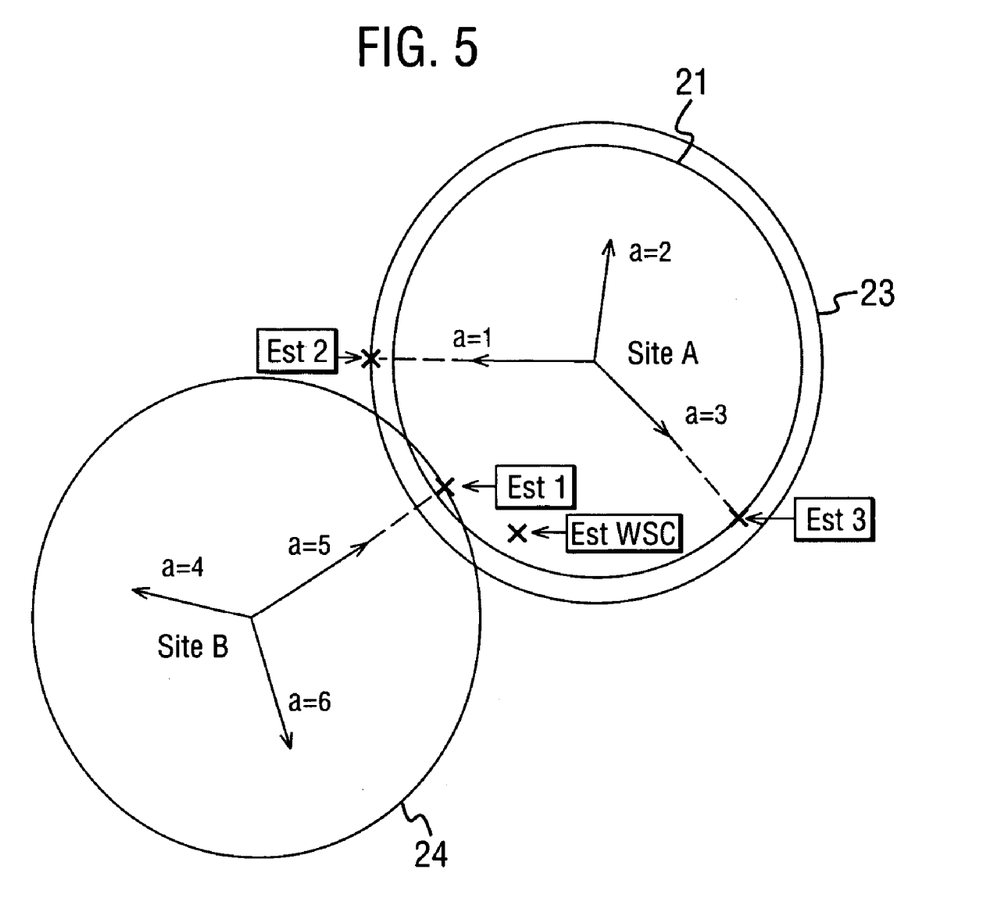
FIG. 5 is a schematic diagram of a WSC location method.

The Weighted Single Cell (WSC) method will now be described with reference to FIG. 5. This method is similar to the WSS method, the main difference between the two consisting in the way that measurements from co-located cells are treated. Note that the physical situation in which this embodiment can be used is the same as that for the first embodiment, namely the situation of FIG. 3. In the WSC method each cell is considered separately from other cells. Thus, the number of preliminary location estimates is equal to the number of RTT, TD measurement pairs. The method is implemented as follows.

Firstly, a distance estimate for each of the serving cells is obtained using the distance estimation equipment of FIG. 1 using RTT, TD measurement pairs formed on each of the three active radio links RL1, RL2, RL3. These distance estimates are the respective radii of the circles labelled 21, 23 and 24 (as before). Note that the circles 21 and 23 are those which were illustrated dotted in the embodiment of FIG. 4.

A separate preliminary single site CI+RTT location estimate is then obtained for each distance estimate, calculated in a polar reference system centred at each cell site. Each preliminary location estimate has a distance from the cell site equal to the distance estimate, and an orientation based on the orientation of the particular antenna for that radio link (unless more accurate direction information is available). The preliminary location estimates are labelled Est 1, Est 2 and Est 3 in FIG. 5. The antenna orientations can be established using the single site CI+RTT location method.

The final location estimate which is labelled Est WSC is the weighted mass centre of the preliminary location estimates Est 1, Est 2, Est 3. Obtaining the weighted mass centre, and the weighting values is the same as for the WSS method described above.

It will be appreciated that there can be more than two cells with active links at each site, in which case fuller RTT data can be taken into account.

In the above methods, reference is made to a CI+RTT location method. One example of such location method will now be described with reference to FIG. 6. The aim of the method is to estimate the UE geographical coordinates and a confidence region where the true UE location is supposedly located with a given degree of confidence $\xi$. The estimated UE coordinates are distance $\rho$ and orientation $\theta$ of the UE from the serving site, represented in the polar reference system. Note that $\theta$ in FIG. 6 corresponds to $d_{EST}$ in FIG. 1. In the following, there is some duplicate description relating to the distance estimation already discussed above, but in this case there is no discussion of how to deal with multiple sites. Note too that like numerals in FIG. 6 denote like parts in FIG. 1.

The estimates are obtained from a probability distribution of the UE geographical location, which is determined by combining observations and a-priori statistical information. A-priori information includes statistical information about the accuracy of DR as a distance measurement and distribution of the UE orientation within cells border.

Figure 6:
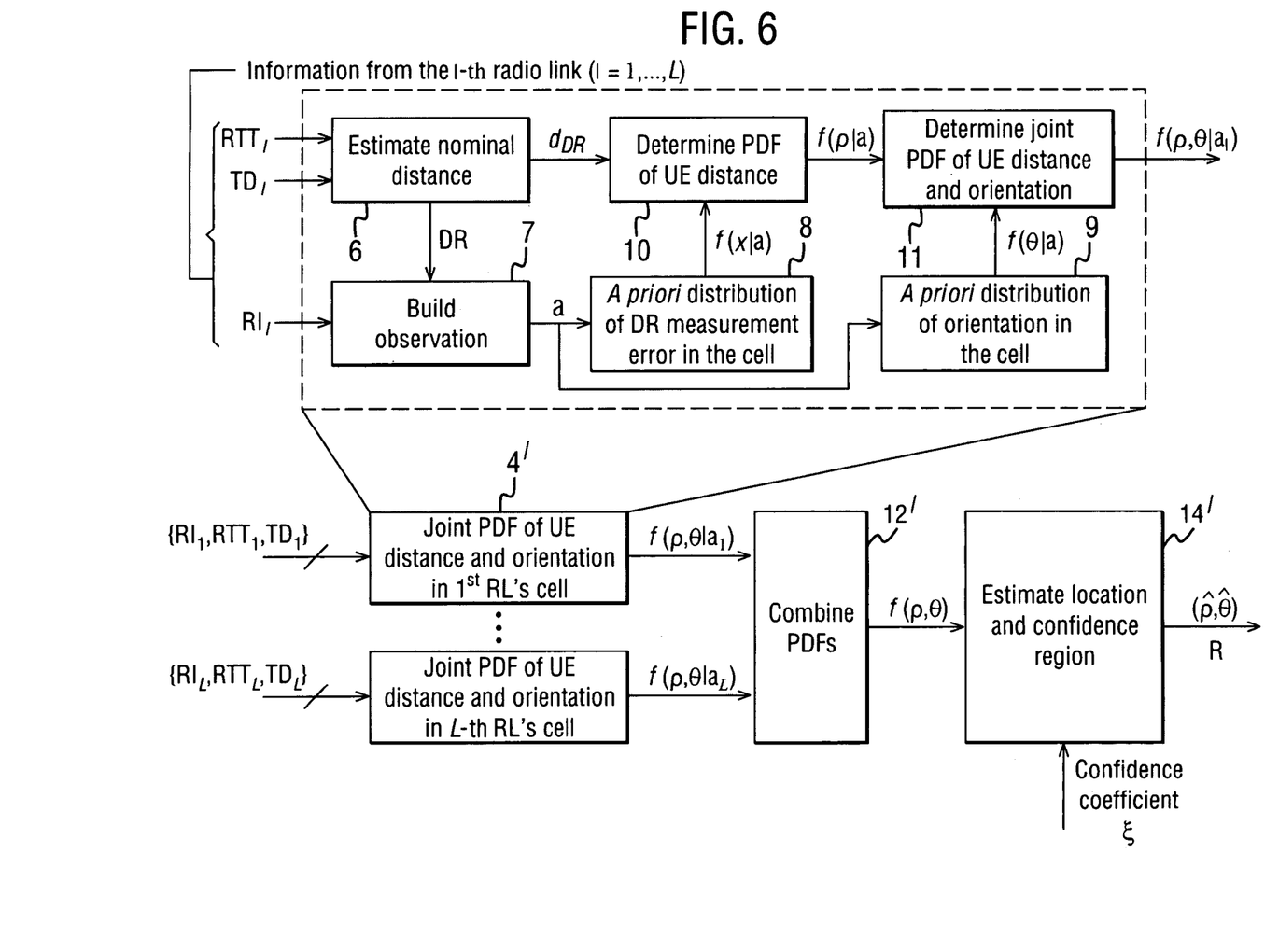
FIG. 6 is a schematic block diagram of equipment for implementing a CI+RTT location method.

Referring to FIG. 6, the location procedure can be seen as a combination of different processing steps, briefly described in the following. The quantization rules at the basis of RTT and Rx–Tx Time Difference definition in UMTS technical specifications, are used to calculate from each {RTT,TD} pair a Double Range Value, DR, and Double Range distance estimate, $d_{DR}$ in block 6. The Double Range is an integer number indicatively equal to the difference RTT–TD; thus it represents an estimate of twice the absolute distance between target UE and (co-located) cells providing the active radio link.

As a result of the nominal distance estimation, the observation a=[RI,DR] (block 7) becomes available. RI is a radio link identifier, for example a cell identifier CI, providing network data.

For example, radio network data for all cells having an active radio link with the user equipment of interest, can include the following:

antenna coordinates $\phi$ half power beam width (HPBW) of the node B's antenna, $\Delta\phi$ $R_F$ the maximum front radius to the service cell $R_B$ the maximum back radius to the service cell The Double Range distance estimate is a raw conversion of RTT and TD, reported from UMTS network elements, in a distance estimate. This conversion does not take into account effects of measurement process impairments (multipath and non-line-of-sight propagation over the mobile radio channel, measurement errors, quantization error, etc.) that contribute determining the so-called Double range measurement error, $\chi \rho = -d_{DR}$, as defined as difference between the exact distance between UE and node B, $\rho$, and Double Range distance estimate, $d_{DR}$. One way to take into account the DR measurement error, that has proved to be very successful in GSM applications, is to supply the location algorithms with a-priori information describing the statistical behaviour of Double Range measurement error $\chi$, as in block 8.

The behaviour of $\chi$ depends on many factors, among them environment and distance between UE and node B. For this reason, the PDF of $\chi$ conditioned by the observation, $f(\chi|a)$, is used as a-priori PDF from which the statistical behaviour of the UE distance from the serving site is derived. Once the PDF $f(\chi|a)$ is available, the DR distance estimate, $d_{DR}$, is used to obtain the probability density function (PDF) (block 10) of the UE distance in the cell providing the active radio link, $f(\rho|a)$.

An analogous but simpler procedure is used to determine the PDF of the UE orientation in the cell providing the active radio link, $f(\theta|a)$. The additional simplicity is due to the fact that an orientation measurement is not available, thus statistical distribution of the UE angular distribution can be defined only by using a-priori cell-based orientation information (block 9) such as cell orientation, width, etc.

The PDFs of distance conditioned by the observation and of orientation conditioned by the observations are then combined with each other (block 11) to determine the joint PDF of UE distance and orientation within the cell providing each active radio link $f(\rho,\theta a)$. The PDFs available at this stage describe the geographical distribution of users within the borders of each single cell served by node B providing each active radio link.

Once the joint PDFs of distance and orientation within all cells providing active radio links are available (blocks 4') they are combined (block 12') to determine the final joint PDF of distance and orientation, $f(\rho,\theta)$. Such distribution includes all information gathered from observations (radio link identifiers and measurements) and a-priori statistics; thus it can be finally used to estimate UE coordinates $(\hat{\rho},\hat{\theta})$ and confidence region R (block 14'). The priming of blocks 4', 12', 14' denotes that they are equivalent to blocks 4, 12 and 14 of FIG. 1, but providing a more complex function.

Thus, the CI+RTT location algorithm provides as outputs:
location calculation results being a set of parameters identifying the coordinates of a location estimate and the parameters of a certain confidence region (a geographical region where the exact UE location is estimated to be with a certain probability)

QoS data which is an indication of whether the location calculation results met the accuracy requirements set in the input quality of service parameters.

The CI+RTT location method involves the two main steps of:
1. estimating the location of the UE in terms of x-y coordinates and
2. calculating a confidence region for this location estimate.

A confidence region is a geographical region where the exact UE location is estimated to be with a given probability, referred to as the confidence coefficient $0<\xi\leq1$.

The location calculation method is implemented by location calculation algorithms. Two classes of location calculation algorithms are used:
Location Estimate Calculation Algorithms to implement step 1
Confidence Region Calculation Algorithms to implement step 2

The combination of location estimate and confidence region parameters is referred to as "shape". The shape definitions supported by the location calculation algorithms described above are:
(i) Point Shape (i.e. including only the location estimate)
(ii) Point with Uncertainty Ellipse Shape (where the confidence region is an ellipse)
(iii) Point with Uncertainty Polygon Shape (where the confidence region is a polygon)
(iv) Point with Uncertainty Arc Shape (where the confidence region is a circular arc)

Figure 7:
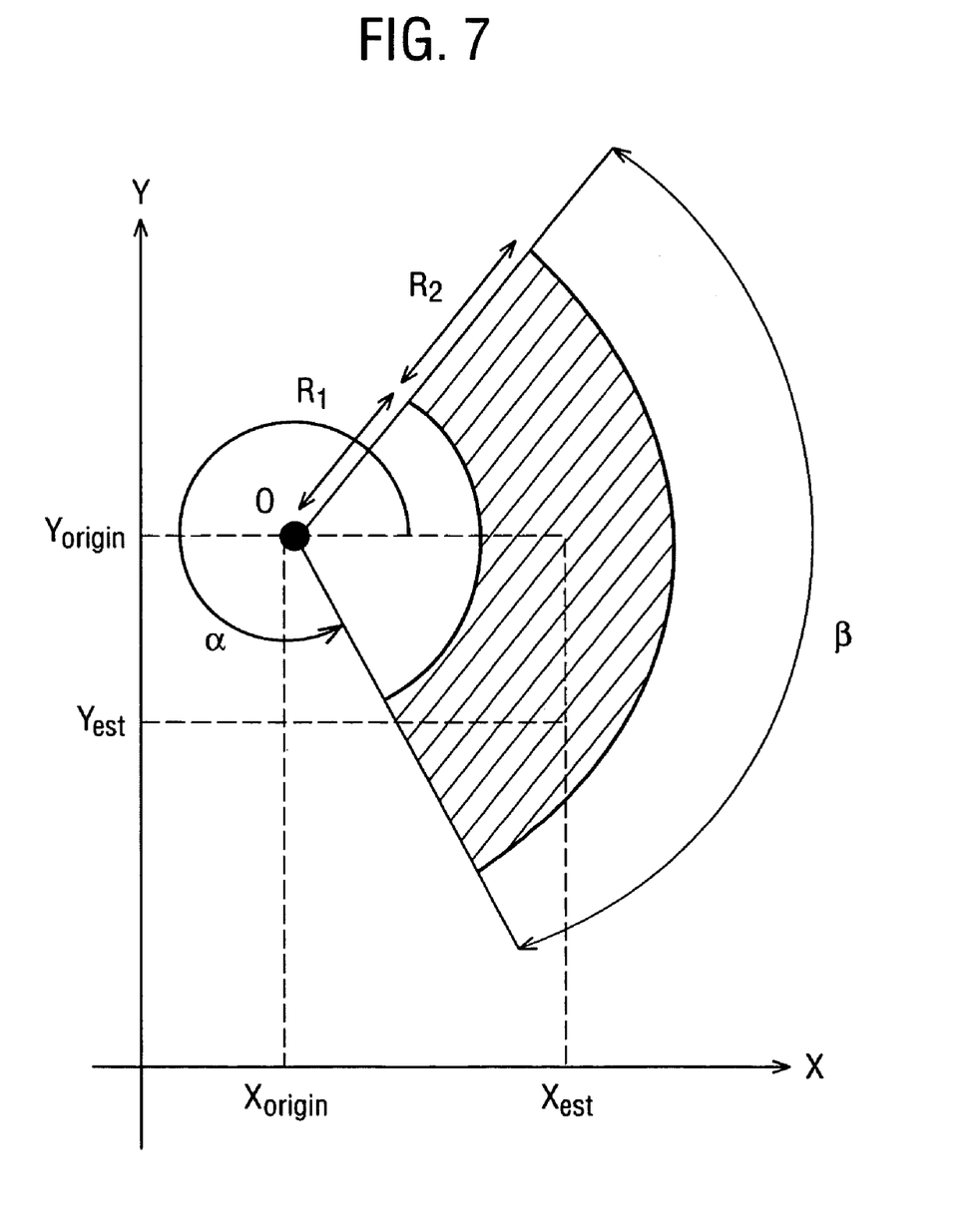
FIG. 7 shows an arc-shaped confidence region.

The only confidence region which will be described herein is the Arc-Shape shown in FIG. 7.

This has the following features:
Coordinates of a location estimate $(\hat{x},\hat{y})$
Coordinates of an origin $x_o$ and $y_o$
Inner radius R1 and uncertainty radius R2
Offset (orientation) angle $\alpha$ and included angle $\beta$
Confidence coefficient value $\xi$ In the context of the Single-Site CI+RTT method, the polar coordinates can be used to introduce the following formal definition of R:

$$Pr((\rho,\theta)\varepsilon R|a_1,\ldots,a_L)=\xi$$

The Arc is the "natural" shape for the Single-Site CI+RTT confidence region. The origin of the arc is at the antenna coordinates, common to all cells providing an active radio link to the UE being located:

$$\begin{cases} x_0 = x_s \\ y_0 = y_s \end{cases}$$

Inner radius $R_1$, uncertainty radius $R_2$, offset angle $\alpha$ and included angle $\beta$ (see FIG. 7) are calculated by means of the above that, when the confidence region is arc shaped and the PDFs of interest are not conditioned by the observations, can be rewritten as:

$$Pr((\rho,\theta)\varepsilon R) = \int\int_R f(\rho,\theta)d\rho d\theta$$
$$= \int_\alpha^{\alpha+\beta} d\theta \int_{R_1}^{R_1+R} f(\rho,\theta)d\rho = \xi$$

The total probability theorem can be invoked to write $f(\rho,\theta)$ as:

$$f(\rho,\theta) = \sum_{m=1}^{M} p_m f(\rho,\theta|a_m)$$

hence $$Pr((\rho,\theta)\varepsilon R) = \int_\alpha^{\alpha+\beta} d\theta \int_{R_1}^{R_1+R_2} \left[\sum_{m+1}^{M} p_m f(\rho,\theta|a_m)\right]d\rho$$

The confidence region parameters $R_1$, $R_2$, $\alpha$ and $\beta$ can be uniquely determined if appropriate additional constraints are introduced, according to requirements of a particular implementation.

Figure 8:
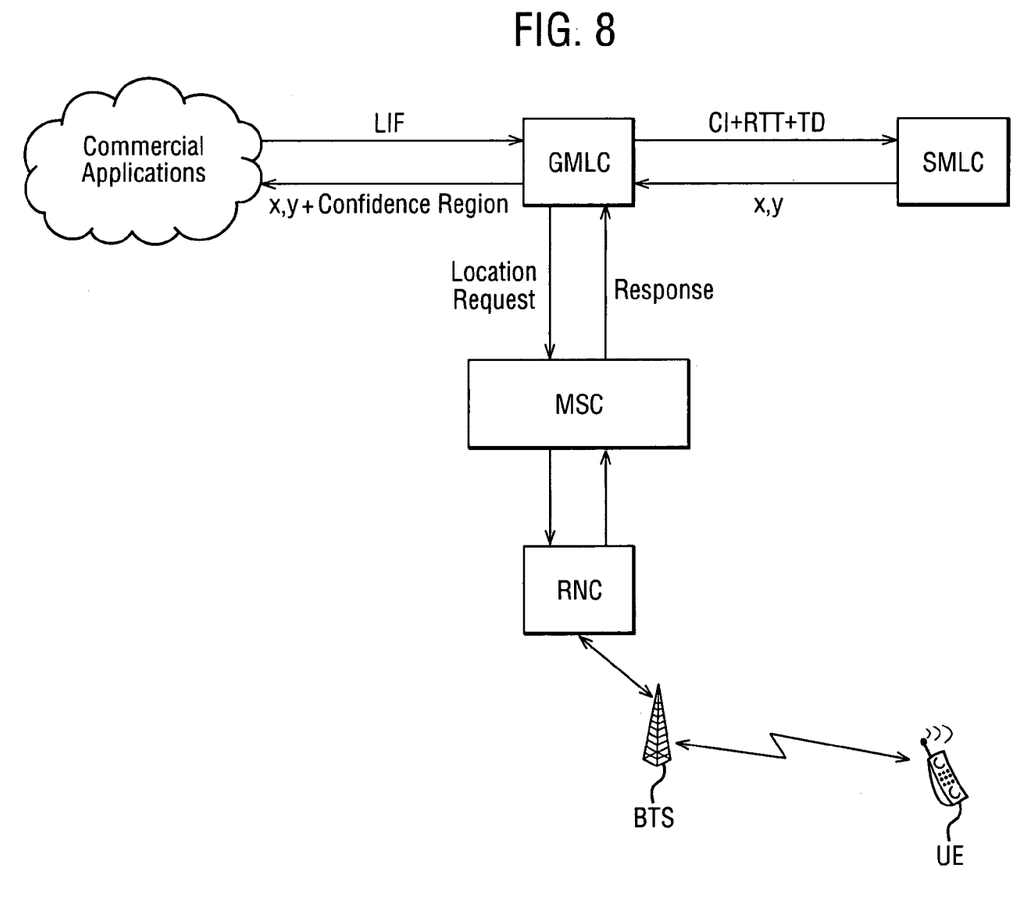
FIG. 8 is a schematic diagram of the architecture of a network.

FIG. 8 is a schematic diagram of the architecture of a network to illustrate where the location methods described above are implemented. A single base station BTS is shown, which can for example be the base station at site A or site B. In fact, base stations at both site A and site B will be in communication with a radio network controller RNC as illustrated for the single base station in FIG. 8. The radio network controller is in communication with a mobile switching MSC which is in turn in communication with a gateway mobile location center GMLC. The gateway mobile location center can receive an LIF (location interoperability forum) request from commercial applications being implemented in the network. The gateway mobile location center dispatches a location request to the mobile switching center which in turn contacts the radio network controller to obtain the necessary network data and return it to the mobile switching center. A response is thus returned to the gateway mobile location center which supplies CI+RTT, TD pairs to a serving mobile location center SMLC. The location methods described hereinabove are implemented at the serving mobile location center and the x, y data is returned to the gateway mobile location center. The gateway mobile location center returns this x, y data together with the confidence region to the commercial application which requested the location data.

Alternatively, the location methods can be implemented at the RNC or in a stand-alone module elsewhere in the network.

Figure 9:
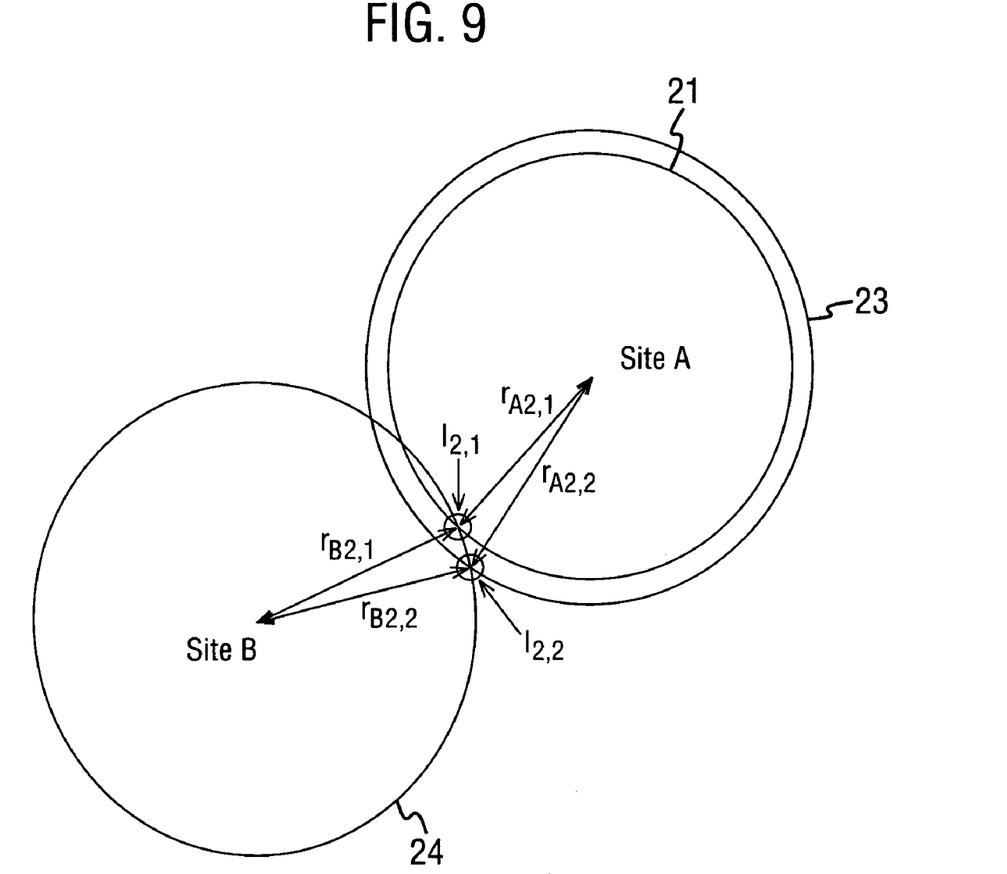
FIG. 9 is a schematic diagram of an IDI method.

Reference will now be made to FIG. 9 to describe a method (so-called Improved Direction Information (IDI)) of enhancing direction information which can then be used in any one of the preceding described techniques. For example, it can be used to select a side where the probabilities for side selection are not good enough. FIG. 9 shows the situation after implementation of the selection methods described with respect to FIGS. 3A and 3B where the second side has been selected as the most probable side. That is, FIG. 9 shows the set $I_2$ of intersections $I_{2,1}$, $I_{2,2}$ as having been finally selected at step S6 of FIG. 3B, and it is assumed that each of these reference points has reasonable probabilities associated with it. Each intersection point in the selected set is considered to represent a new virtual measurement which can be used to improve direction information in a number of different ways. The virtual measurement vectors are labelled $r_{A2,1}$, $r_{A2,2}$ for site A and $r_{B2,1}$ and $r_{B2,1}$ for site B. Each virtual measurement has a distance (the length of the new measurement vector r) and a direction (the orientation of the new measurement vector r). The distances and orientations can be utilised in any location method that uses directional information, e.g. one of the previously described location methods such as WSS, WSC to improve the accuracy of the generated estimate.

The number of virtual measurements to be used in one of the location methods can vary. For example, all sites can have as many new, virtual measurements as there are selected points.

As a further alternative, two or more virtual measurements can be combined into one. For example, for site B in FIG. 9 there are two virtual measurements ($r_{B2,1}$, $r_{B2,2}$), but only one original measurement was made (the one that gave rise to the circle 24). Therefore, a single virtual measurement would be derived as an average of the two virtual measurement vectors $r_{B2,1}$, $r_{B2,2}$.

The virtual measurements can be associated with probabilities derived for example from different phrases of the SELRP method discussed above.

By having improved direction information, better estimates of the location of the mobile station can be obtained.

The invention claimed is:

1. A method comprising:
receiving first measurement data relating to at least one radio link between a mobile station in a wireless communications network and a first site and providing a first distance estimate of the mobile station from the first site based on the first measurement data;
receiving second measurement data relating to at least one radio link between the mobile station and a second site and providing a second distance estimate of the mobile station from the second site;
determining first and second intersection points between a first circle centered at the first site of a first radius corresponding to the first distance estimate and a second circle centered at the second site of a second radius corresponding to the second distance estimate, said first and second intersection points lying on opposed sides of a line passing through the first and second sites;
generating at least one provisional location estimate for a location of the mobile station using first measurement data relating to the at least one radio link between the mobile station and the first site, and second measurement data relating to the at least one radio link between the mobile station and the second site;
determining using the distances of said first and second intersection points to said at least one provisional location estimate, a probability that the mobile station lies on the same side of the line as each of said first and second intersection points;
selecting at least one of the first and second intersection points based on which side of the line there is a greater probability that the mobile station lies;
using said selected at least one of the first and second intersection points in determining a location estimate; and
generating a location estimate for the mobile station.

2. A method according to claim 1, wherein the determining first and second intersection points comprises determining a first set of intersection points and a second set of intersection points, each set including more than one intersection point.

3. A method according to claim 1, wherein said at least one intersection point is selected to lie on a side of the line on which at least one of the at least one provisional location estimate lies.

4. A method according to claim 1, which further comprises using a weighted single cell location method to generate the at least one provisional location estimate.

5. A method according to claim 1, which further comprises using a weighted single site location method to provide the at least one provisional location estimate.

6. A method according to claim 1, wherein a plurality of provisional location estimates are generated using different location methods.

7. A method according to claim 1, which further comprises determining a distance from at least one of the first and second sites to said at least one of the first and second intersection points, and an orientation of said at least one of the first and second intersection points, with respect to said at least one of the first and second sites.

8. A method according to claim 7, which further comprises using said determined distance and orientation in a location calculation method to generate an improved location estimate.

9. A method according to claim 1, which further comprises determining the distance from said at least one provisional location estimate from each of the first and second sites respectively, and using said distances to determine a probability that the mobile station lies on one or other side of the line.

10. A method according to claim 1, wherein each of the first and second intersection points are associated with respective probabilities that the mobile station lies on their side of the line.

11. A method according to claim 8, which further comprises allocating probabilities to said first and second intersection points and utilizing said probabilities with said determined distance and orientation in said location calculation method.

12. An apparatus comprising:
means for receiving measurement data relating to radio links established between a mobile station in a cellular communications network and each of first and second sites, and providing first and second distance estimates of the mobile station from the first and second sites respectively based on the measurement data;
means for determining first and second intersection points between a first circle centered at the first site of a first radius corresponding to the first distance estimate and a second circle centered at the second site of a second radius corresponding to the second distance estimate, said first and second intersection points lying on opposed sides of a line passing through the first and second sites;

means for generating at least one provisional location estimate for a location of the mobile station using first measurement data relating to the at least one radio link between the mobile station and the first site, and second measurement data relating to the at least one radio link between the mobile station and the second site;

means for determining, using the distances of said first and second intersection points to said at least one provisional location estimate, a probability that each of said first and second intersection points lies on a same side of the line as the mobile station;

means for selecting at least one of the first and second intersection points based on which side of the line there is a greater probability that the mobile station lies;

means for utilizing the selected at least one of the first and second intersection points in determining a location estimate; and means for generating a location estimate for the mobile station.

13. An apparatus according to claim 12, which comprises means for determining a distance from at least one of the first and second sites to said at least one of the first and second intersection points, and an orientation of said at least one of the first and second intersection points, with respect to said at least one of the first and second sites.

14. An apparatus comprising:

a receiver configured to receive measurement data relating to radio links established between a mobile station in a cellular communications network and each of first and second sites, and to provide first and second distance estimates of the mobile station from the first and second sites respectively based on the measurement data;

an intersection determining unit configured to determine first and second intersection points between a first circle centered at the first site of a first radius corresponding to the first distance estimate and a second circle centered at the second site of a second radius corresponding to the second distance estimate, said first and second intersection points lying on opposed sides of a line passing through the first and second sites;

a provisional location estimate generator configured to generate at least one provisional location estimate for a location of the mobile station using first measurement data relating to the at least one radio link between the mobile station and the first site, and second measurement data relating to the at least one radio link between the mobile station and the second site;

a probability determining unit configured to determine a probability that each of said first and second intersection points lies on a same side of the line as the mobile station, wherein the probability is based on the distances of said first and second intersection points to the at least one provisional location estimate; and a selector configured to select at least one of the first and second intersection points based on which said of the line there is a greater probability that the mobile station lies;

a determination unit configured to utilize at least one of the first and second intersection points in determining a location estimate, wherein the apparatus is configured to generate a location estimate for the mobile station.

15. An apparatus according to claim 14, comprising a serving mobile location center.

16. An apparatus according to claim 14, further comprising a distance determining unit configured to determine a distance from at least one of the first and second sites to said at least one of the first and second intersection points, and an orientation of said at least one of the first and second intersection points, with respect to said at least one of the first and second sites.

17. A method comprising:

receiving first measurement data relating to at least one radio link between a mobile station in a wireless communication network and a first site and providing a first distance estimate of the mobile station from the first site based on the first measurement data;

receiving second measurement data relating to at least one radio link between the mobile station and a second site and providing a second distance estimate of the mobile station from the second site;

determining first and second intersection points between a first circle centred at the first site of a first radius corresponding to the first distance estimate and a second circle centred at the second site of a second radius corresponding to the second distance estimate, said first and second intersection points lying on opposed sides of a line passing through the first and second sites;

generating at least one provisional location estimate for a location of the mobile station using first measurement data relating to the at least one radio link between the mobile station and the first site, and second measurement data relating to the at least one radio link between the mobile station and the second site;

selecting at least one of the first and second intersection points based on which side of the line there is a greater probability that the mobile station lies, wherein the selecting said at least one of the first and second intersection points comprises selecting at least one intersection point to lie on a side of the line on which the at least one provisional location estimate lies;

using said selected at least one of the first and second intersection points in determining a location estimate; and generating a location estimate for the mobile station.

18. An apparatus comprising:

a receiver configured to receive measurement data relating to radio links established between a mobile station in a cellular communications network and each of first and second sites, and to provide first and second distance estimates of the mobile station from the first and second sites respectively based on the measurement data;

an intersection determining unit configured to determine first and second intersection points between a first circle centred at the first site of a first radius corresponding to the first distance estimate and a second circle centred at the second site of a second radius corresponding to the second distance estimate, said first and second intersection points lying on opposed sides of a line passing through the first and second sites;

a provisional location estimate generator configured to generate a provisional location estimate for a location of the mobile station using first measurement data relating to the at least one radio link between the mobile station and the first site, and second measurement data relating to the at least one radio link between the mobile station and the second site;

a selector configured to select at least one of the first and second intersection points based on which side of the line there is a greater probability that the mobile station lies, wherein said at least one intersection point is selected to lie on a side of the line on which the at least one provisional location estimate lies; and a determination unit configured to utilize at least one of the first and second intersection points in determining a location estimate, wherein the apparatus is configured to generate a location estimate for the mobile station.

19. A computer program, embodied on a computer readable medium, the computer program configured to control a processor to perform a method comprising:

receiving first measurement data relating to at least one radio link between a mobile station in a wireless communications network and a first site and provide a first distance estimate of the mobile station from the first site based on the first measurement data;

receiving second measurement data relating to at least one radio link between the mobile station and a second site and provide a second distance estimate of the mobile station from the second site;

determining first and second intersection points between a first circle centered at the first site of a first radius corresponding to the first distance estimate and a second circle centered at the second site of a second radius corresponding to the second distance estimate, said first and second intersection points lying on opposed sides of a line passing through the first and second sites;

generating at least one provisional location estimate for a location of the mobile station using first measurement data relating to the at least one radio link between the mobile station and the first site, and second measurement data relating to the at least one radio link between the mobile station and the second site;

determining, using the distances of said first and second intersection points to said at least one provisional location estimate, a probability that the mobile station lies on the same side of the line as each of said first and second intersection points;

selecting at least one of the first and second intersection points based on which side of the line there is a greater probability that the mobile station lies;

using said selected at least one of the first and second intersection points to determine a location estimate; and generating a location estimate for the mobile station.

* * * * *